United States Patent
Van Wiemeersch et al.

(10) Patent No.: US 9,842,444 B2
(45) Date of Patent: Dec. 12, 2017

(54) PHONE SLEEVE VEHICLE FOB

(71) Applicant: Ford Global Technologies, LLC, Dearborn, MI (US)

(72) Inventors: John Robert Van Wiemeersch, Novi, MI (US); Robert Bruce Kleve, Dearborn, MI (US); Kevin Thomas Hille, Plymouth, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 0 days.

(21) Appl. No.: 14/301,493

(22) Filed: Jun. 11, 2014

(65) Prior Publication Data

US 2015/0363988 A1 Dec. 17, 2015

(51) Int. Cl.
| | |
|---|---|
| *H04B 1/38* | (2015.01) |
| *G07C 9/00* | (2006.01) |
| *H04M 1/11* | (2006.01) |
| *H04L 29/08* | (2006.01) |
| *H04W 4/00* | (2009.01) |
| *H04M 1/18* | (2006.01) |
| *H04M 1/725* | (2006.01) |
| *H04W 4/04* | (2009.01) |

(52) U.S. Cl.
CPC ........ *G07C 9/00309* (2013.01); *H04L 67/125* (2013.01); *H04M 1/11* (2013.01); *H04M 1/72533* (2013.01); *H04W 4/008* (2013.01); *G07C 2009/00769* (2013.01); *H04M 1/185* (2013.01); *H04M 1/72527* (2013.01); *H04W 4/046* (2013.01)

(58) Field of Classification Search
CPC .............. H04W 88/02; H04M 1/6091; H04M 1/72522; B60K 35/00; G07C 9/00309
USPC ................... 455/557, 556.1, 569.2; 340/438
See application file for complete search history.

(56) References Cited

U.S. PATENT DOCUMENTS

| | | | |
|---|---|---|---|
| 9,230,440 B1 * | 1/2016 | Penilla ................ | G08G 1/145 |
| 2007/0156311 A1 * | 7/2007 | Elcock et al. .................. | 701/29 |
| 2008/0048846 A1 * | 2/2008 | Nagai et al. ............ | 340/426.17 |
| 2010/0103036 A1 * | 4/2010 | Malone .................. | B60R 25/24 |
| | | | 342/357.34 |
| 2012/0172010 A1 * | 7/2012 | Oman .................... | G07C 5/008 |
| | | | 455/414.1 |
| 2012/0313768 A1 * | 12/2012 | Campbell et al. ........... | 340/438 |
| 2013/0141212 A1 * | 6/2013 | Pickering ................. | G05B 1/01 |
| | | | 340/5.61 |
| 2013/0211623 A1 | 8/2013 | Thompson et al. | |
| 2013/0249482 A1 * | 9/2013 | Iwanaga et al. ............. | 320/108 |
| 2014/0278608 A1 * | 9/2014 | Johnson ................ | B60R 25/24 |
| | | | 705/5 |
| 2014/0335897 A1 * | 11/2014 | Clem et al. ................ | 455/456.3 |

* cited by examiner

*Primary Examiner* — Danh Le (74) *Attorney, Agent, or Firm* — Burgess Law Office, PLLC; Raymond L. Coppiellie (57) ABSTRACT

A system and method for remotely communicating with a vehicle using a mobile communication device and a sleeve associated with the mobile communication device. The sleeve including a transceiver, the transceiver enabling communication between the mobile communication device and the vehicle. The mobile communication device provides commands to the vehicle through the sleeve.

18 Claims, 5 Drawing Sheets

PHONE SLEEVE VEHICLE FOB

CROSS-REFERENCE TO RELATED APPLICATIONS

Not Applicable.

BACKGROUND OF THE INVENTION

1. Field of the Invention

The present invention relates generally to a vehicle key fob; and more specifically, to a phone and sleeve combination functioning as a vehicle key fob.

2. Description of Related Art

Modern motor vehicles utilize a keyless entry system for controlling access without using a traditional mechanical key. Keyless entry systems eliminate the need for a standard car key; pressing a button on a remote enables an individual to unlock a car door from several or hundreds of feet away depending on the design approach. The remote, referred to as a fob, operates such that when a user presses a button on the fob, the fob transmits a code or signal. The vehicle receives the signal and an appropriate reader device determines the validity of the code or signal and takes action accordingly.

Another type of fob used with a motor vehicle is a "proximity" key fob. Proximity key fobs also use a signal; however, they must come within very close range to a corresponding reader device, typically 5 to 15 feet, generally mounted on the vehicle exterior for access or in the vehicle cabin for ignition authorization. The reader system includes several antennas in or on the vehicle that transmit a challenge pulse train to the fob, and then one antenna that identifies the proximity key fob through a radio pulse generator in the key fob housing that transmits back to the vehicle. Depending on the system, after receiving proper identification, grasping the door handle unlocks the vehicle. The "proximity key" also activates the vehicle ignition, without inserting a key in the ignition, once the "key" fob is inside the vehicle. For example, the vehicle checks to determine if the "key" fob is inside the vehicle, if so the vehicle operator need only place their foot on the brake and press a button to start the vehicle. Pressing the start button without one's foot on the brake places the electrical system in accessory mode. Such a vehicle access and drive away system using this type of proximity key is typically referred to as Passive Entry/Passive Start, or PEPS, system.

Although replacing a traditional vehicle mechanical key and providing a system or method for remotely interacting with a motor vehicle, the fob must be carried by the vehicle operator just like a traditional mechanical key. Many vehicle owners welcome the ability to monitor and control the vehicle remotely through the fob; however, as the fob performs more functions, it tends to increase in size. Further, many individuals have more than one vehicle resulting in the need to carry multiple fobs.

SUMMARY OF THE INVENTION

The present invention includes a system and method for remotely communicating with a vehicle. In one example, the system includes a mobile communication device paired and communicating with a sleeve. The sleeve including a transceiver in communication with the mobile communication device and the vehicle. The mobile communication device operates to provide commands to the vehicle and to receive information from the vehicle through the sleeve.

In an additional example, the system and method includes a transceiver in the sleeve receiving operation programming from the communication device wherein the mobile communication device also controls the transceiver. In addition, the mobile communication device includes a graphical user interface associated with a particular vehicle. Various examples of systems and methods for using the mobile communication device to control the vehicle are described herein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
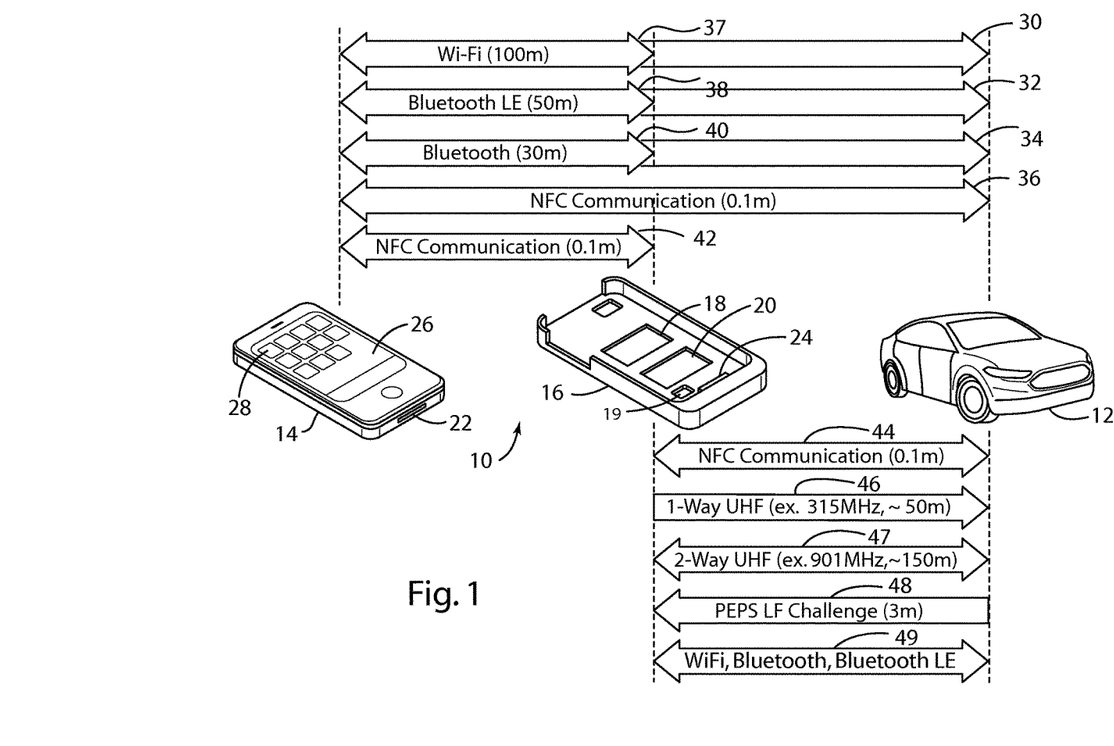
FIG. 1 is a schematic illustrating data transfer between a phone, a sleeve and a vehicle according to the present invention.

FIG. 1 schematically illustrates a system, seen generally at 10, for communicating with a vehicle 12. The system 10 includes a mobile communication device, in one example a phone 14, and a sleeve or case 16. In the present example, the phone 14 is a mobile phone, typically of the type referred to as a smart phone having a touchscreen interface. While the present example illustrates the use of a phone 14 as a communication device, or interface with the individual, the communication device may be a handheld computer, personal digital assistant, multimedia device, tablet or combination of these data devices. The sleeve or case 16 is an outer covering or housing typically placed over the phone 14 to protect the phone 14. In one example, the sleeve 16 is a wireless charging sleeve. Wireless charging can be accomplished via an inductive charging method, resonant charging method, or conductive method wherein a sleeve or case includes receiver circuitry that receives and transfers electricity through a magnetic field such as Qi® or Powermat®, or it can use a simple DC contact system such as the Duracell MyGrid® conductive charging system. Wiring in the case or sleeve routes power from the receiver circuitry in the sleeve to the battery of the phone through the phone's existing port used for charging. Such receiver circuitry for the inductive and resonant receivers typically utilizes low-frequency energy harvesting circuits, a controller and a regulator to support the wireless charging functions, seen schematically at 18. Such receiver circuitry for the DC conductive solution typically utilizes a switching regulator to convert the incoming power (typically 13V) down to the DC power level of the phone (typically 5V), to support the wireless charging functions, seen schematically at 18.

Modern mobile phones typically provide various means for off-board systems to communicate wirelessly with the phone directly shown in 30, 32, 34 and 36, for example, Wi-Fi®, Bluetooth®, Bluetooth® low energy and Near Field Communication (NFC). As shown in FIG. 1, the phone 14 communicates with a vehicle 12 using such means. However, such communication requires that a corresponding element on the vehicle is on or active and capable of receiving a communication. Maintaining a corresponding element in an on or active state dramatically increases the key-off load on the vehicle battery since the corresponding wireless device receiver element in the vehicle 12 (i.e., WiFi®, Bluetooth®, NFC, etc.) continues to draw current while listening for a customer's wireless device even though the vehicle 12 is off.

In one example of the present invention, the sleeve 16 is a wireless charging sleeve that includes vehicle fob circuitry 20. The fob circuitry includes at least one, and typically, multiple transceivers used to communicate with the vehicle 12. Examples of such transceivers used include a UHF transmitter or UHF transmitter/receiver associated with a remote keyless entry (RKE) system and/or a low-frequency transmitter/receiver associated with a passive entry passive start (PEPS) system. The sleeve 16 slides over the phone 14 with the existing communication/charging port 22 on the phone 14 engaging the connector 24 enabling the wireless charging sleeve to charge and provide power to the phone 14 through wireless charging circuitry 18 located in the sleeve. Since vehicles 12 are designed to have a power-optimized UHF/LF receiver system already on and actively listening for a transmission, adding a UHF transmitter function or the full PEPS LF/UHF function to the sleeve 16 leverages that existing circuitry with no incremental power consumption from the vehicle battery and adds a universal fob capability to the wireless charging sleeve 16 with minimal incremental cost over that of a conventional PEPS fob.

The wireless charging circuitry 18 typically includes electronics integrated into the body of the sleeve 16. The electronics may include a receiver coil, circuit board, and devices that harvest LF energy emitted by the charge pad primary coil or coils (80-250 kHz band), rectifies it and filters it down to 5 Vdc for the phone with, typically, a 1 amp current delivery capability. With minor modification, the electronics may also charge a battery 19 in the sleeve 16 powering only the fob circuitry 20 in the sleeve 16 and fob functions so the sleeve 16 can operate passively as a conventional display-less fob even when the phone battery is without adequate power. In this example, the battery 19 is not part of the charging circuitry 18; however, it could be charged by the charging circuitry 18. Alternatively, a second set of peripheral coils could be added to the sleeve 16 to harvest and store Bluetooth® and/or NFC energy emanating from the phone 14 or other nearby sources into the thin rechargeable battery 19 to help maintain a good state of charge sufficient to power the fob circuitry 20 in the sleeve 16. Further, the fob circuitry 20 may run in a low-frequency to low-frequency backup mode. The harvested power could be stored in a sleeve battery 19 and/or used to directly power the fob circuitry 20.

Using a RKE/PEPS UHF/LF transmitter in the sleeve 16 would not require any special action to charge since it charges simultaneously with the phone when the user recharges the phone battery. For example, the RKE/PEPS transmitter could be charged by one of several options, including tapping off the wireless charging receiver circuit 18 in the sleeve 16, tapping off the 5V DC input retained for conventional wired cable charging, harvesting energy from the phone's Bluetooth®, WiFI®, or harvesting energy from the phone's NFC, if available, to store energy for the fob circuitry 20 and fob functions. In some examples, since the sleeve 16 is frequently recharged, it enables the sleeve 16 to use the fob circuitry 20 to listen for UHF from the vehicle and be contacted or alerted directly from the vehicle for intermittent events like an alarm trigger.

Examples of the battery 19 in the sleeve 16 are a thin ultracapacitor or rechargeable battery capable holding 5-10 mAhr of charge at 3V. A 5 mAhr in the fob sleeve battery 19 or ultracapacitor would give about 2 weeks of reserve— longer than the period between typical phone re-charging procedures. During either normal 5V USB DC charging or wireless charging of the phone, the receiver/charging circuitry 18, either the 5VUSB input or the wireless power receiver, could be used to provide a step-down regulated 3V to charge the ultracapacitor or battery 19 used to provide power for the fob circuitry 20. The fob circuitry 20 runs off either the ultracapacitor or battery 19 to provide fob functionality and other long-range functions. In another method of operation. the sleeve 16 may include modified sleeve circuitry including a 2.5 GHz energy harvester (Bluetooth®) or 13.56 MHz harvester (NFC) to charge the ultracapacitor or battery 19.

The fob circuitry 20 may also operate without battery power in a low-frequency to low-frequency back-up mode similar to today's fobs. In this back-up mode, the fob sleeve must be only a few inches from the vehicle back-up transceiver in order to allow the fob to harvest sufficient LF energy to accomplish two-way LF communication with the vehicle. Programming of the fob sleeve is typically done via only the back-up mode method to ensure high security in the mating event that pairs the fob to the vehicle.

In addition, wireless charging sleeves typically allow charging of the phone via the wireless receiver or by plugging in a standard USB Micro-B cable into the female connector at the bottom of the sleeve. A wireless charging pad or a USB Micro-B source could power the fob circuitry 20. Additionally, the fob circuitry 20 may run solely off power from a plug-in USB Micro-B cable. In each case, the 5V power is stepped down to power the fob circuitry 20 and correspondingly the NFC and PEPS transceiver functionality. In the case of a simple 5V input system without RF power harvesting, the DC power would be stored in a sleeve 16 power reserve; i.e., the ultracapacitor or battery 19.

One aspect of the fob circuitry 20 is to collect enough power to keep the fob circuitry powered until the next time the phone 14 is recharged. Thus, compared to the 2-year battery goal for today's fob, the fob circuitry 20 in the sleeve 16 requires significantly less storage capacity for the same RKE/PEPS functions.

Turning again to FIG. 1, communication between the phone's 14 microprocessor/app functions and the vehicle 12 may be accomplished directly via WiFi® 30, Bluetooth® low energy 32, Bluetooth 34, or NFC 36 or other transceiver or transponder functionality. That is, the phone 14 may communicate directly with the vehicle 12. However, as set forth above, these methods of communication may have certain drawbacks.

Pairing the phone 14 with the sleeve 16 such that the phone communicates directly with the fob circuitry 20 in the sleeve, including the RKE/PEPS transmitter/receiver function, enables the phone 14 to communicate with the vehicle through the sleeve 16. For example, the phone 14 may include a touchscreen 26 having a graphical user interface (GUI) 28 wherein a user or operator utilizes the phone 14 GUI 28 to deliver/send commands to fob circuitry 20 via Bluetooth® LE 38, Bluetooth® 40, or NFC 42. The sleeve 16 communicates and relays the user's instructions to the vehicle 12 via NFC 44, 1-way UHF 46, 2-way UHF 47 or RKE/PEPS 48. In addition, the fob circuitry 20 may also communicate and relay the user's instructions to the vehicle 12 through WiFi®, Bluetooth® and Bluetooth® low energy 49. In a further example, the fob circuitry 20 located in the sleeve 16 could, upon receiving instruction from the user or operator, send a command via 150 m UHF to wake vehicle and start-up Sync®, WiFi®, Bluetooth®, or other proprietary or nonproprietary communication protocol enabling direct phone 14 to vehicle 12 communications. Such systems would remain in an inactive state reducing key off loads (KOL) and corresponding parasitic battery power drain until receiving a communication from the user or operator through the phone 14 and sleeve 16 combination. Additionally, such systems avoid the costs of a separate touch screen on the fob allowing the fob to be simpler and cheaper while offering the customer a very high level, flexible and easily modified and expanded human machine interface, for example the graphical user interface 28 of the touchscreen 26 of the phone 14. The graphical user interface 28 provides a much higher number of functions than a physical interface, which is limited by physical space of the fob or the sleeve. For example, the graphical user interface 28 enables changing buttons with software, provides a more attractive interface with more user information and features. Accordingly, the present invention leverages the graphical user interface 28 of the phone 14 in combination with the sleeve 16 to provide the user with a multiple function fob.

Figure 2:
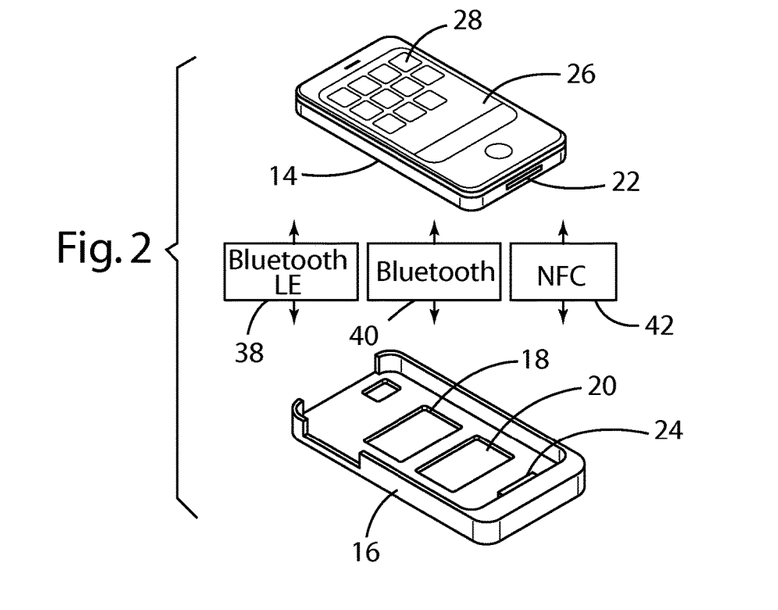
FIG. 2 is a schematic illustrating communication between the phone and the sleeve.

FIG. 2 shows the phone 14 and sleeve 16 paired using either Bluetooth® 38, 40 or NFC 42 if available. A Bluetooth® pair uses, between the respective devices, an optional pre-shared key authentication and encryption algorithms widely considered acceptably strong when correctly used. During Bluetooth® pairing the devices mutually authenticate each other using a passkey and set up a link key for later authentication. Additional measures may be implemented prior to placing the sleeve in a discoverable mode, during which Bluetooth® devices look for and find corresponding devices enhancing the security of the system. Such measures may include a button that is triggered manually by the user to initiate discoverable mode or a button that is triggered upon insertion of the device into the sleeve that initiates discoverable mode for a period of time. The communication range of NFC is limited to 10 centimeters. While NFC alone does not ensure secure communications, establishing a secure channel between two NFC devices is one approach to secure communications.

Figure 3A:
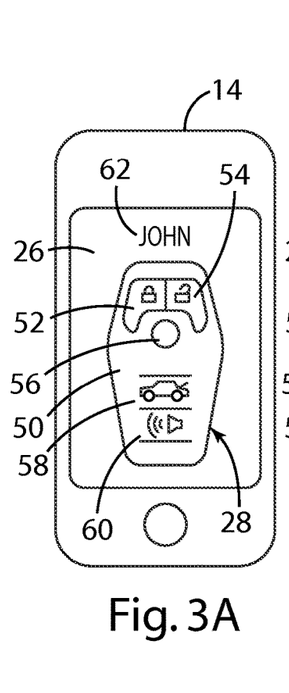
FIGS. 3A-3C illustrate examples of different GUI displays.
Figure 3B:
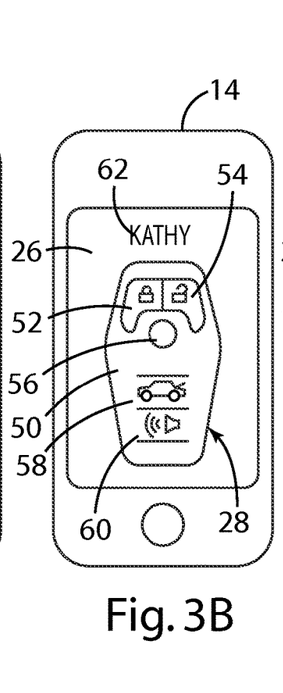
Figure 3C:
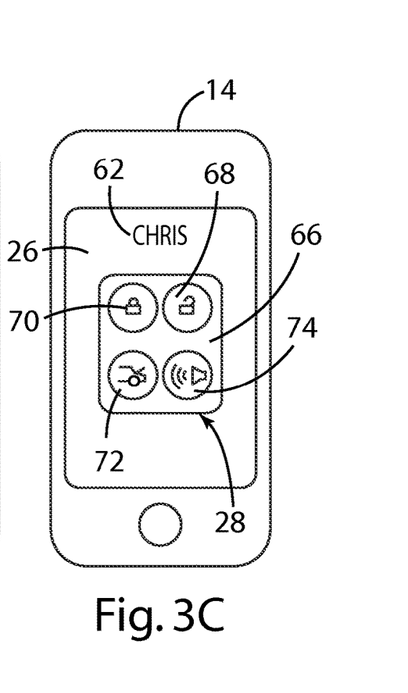

As illustrated in FIGS. 3A-3C the user has the ability to select different GUI displays for different vehicles or different users. The GUI 28 display of FIG. 3A illustrates a particular style of vehicle fob 50 including a lock button 52, an unlock button 54, a remote start button 56, an open trunk button 58 and a panic or alarm button 60. The user interacts with the GUI 28 display of the fob 52 to transmit the fob commands to the vehicle. As shown in FIGS. 3A and 3B, the GUI 28 displaying fob 50 may also include the user's name 62 indicating that the fob 50 may be customized to a particular user. Operation thereof presets the vehicle 12 to a particular user; for example, user preferences such as seat positions, steering wheel position, exterior mirror settings, climate control or temperature settings and stereo presets. In addition, some vehicles such as the Ford Escape® have settings preventing the vehicle from exceeding a maximum speed, and activating or deactivating other systems to improve driving safety for inexperienced drivers, when a particular key or fob is used. FIG. 3C illustrates another fob style having four buttons, and unlock button 68 a lock button 78 trunk open button 72 and an alarm/panic button 74. The fob styles are for illustrative purposes only since each physical vehicle fob may be represented as a GUI 28 on the touchscreen 26 of the phone 14. In addition, the GUI 28 need not display or represent a physical vehicle fob. Instead, the GUI 28 may be a plurality of tabs, buttons or icons on the touchscreen 26 of the phone 14 whereby an individual simply touches one of the tabs, buttons or icons to activate a particular setting (see FIG. 1). The GUI may also include identifiers particular to the vehicle of intended use, for example pictorial representations of the vehicle may be used, such as a red Mustang® or blue Taurus®. In the present, example FIGS. 3A-3C show the fob 50 on a single page or GUI 28; however, the GUI 28 may include multiple pages. For example, the phone 14 may have multiple pages one for each vehicle requiring a fob 50. In addition, each of those fobs 50 may include multiple subpages relating to the operation and settings of the fob 50 or vehicle 12.

Figure 4A:
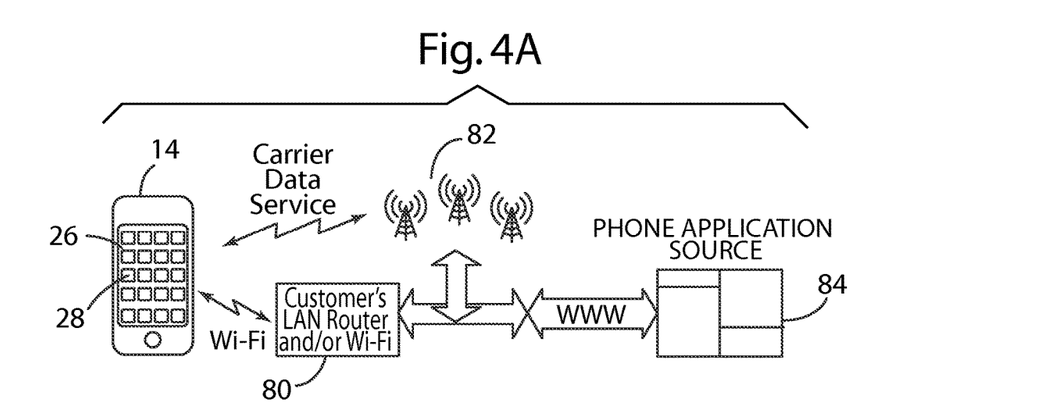
FIG. 4A is a schematic example of a method of sleeve authorization.
Figure 4B:
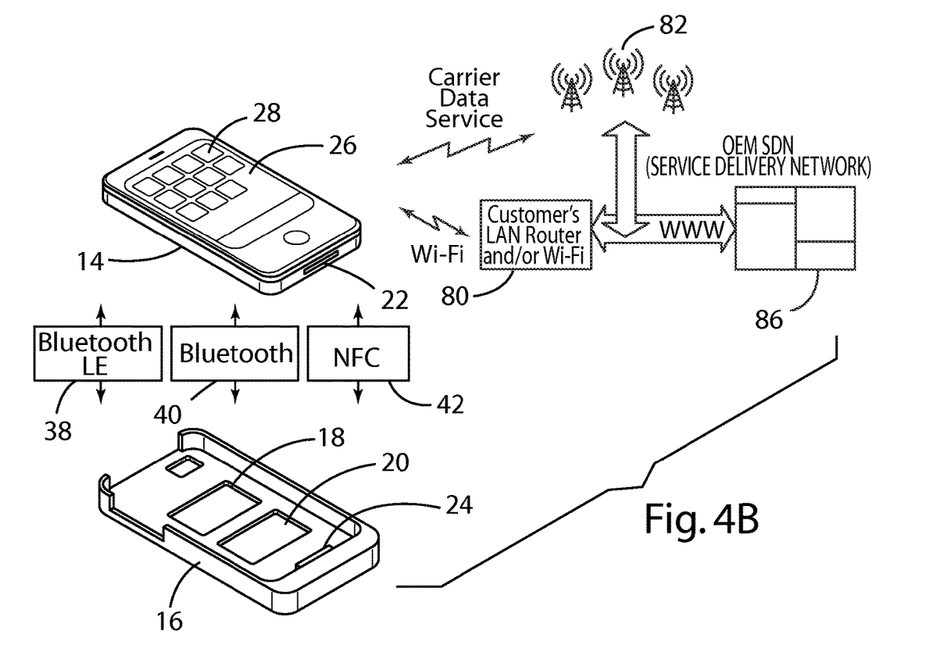
FIG. 4B illustrates a schematic example of the method of sleeve authorization and activation.
Figure 4C:
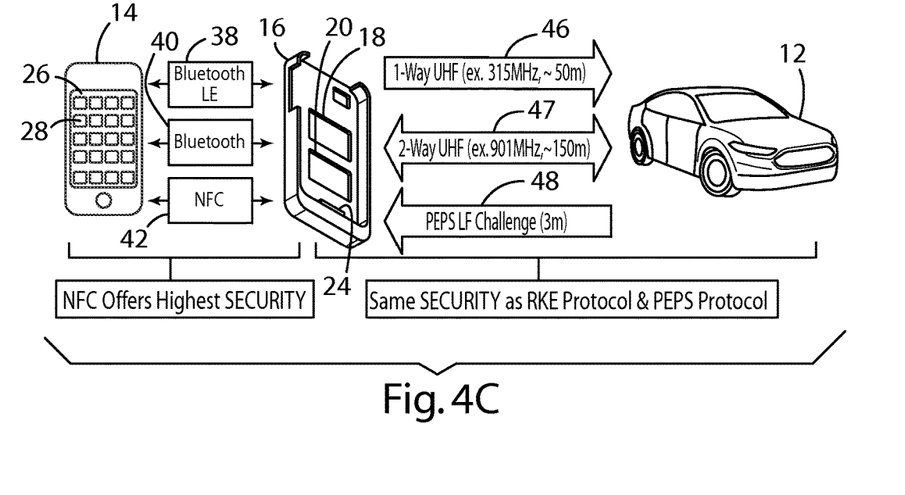
FIG. 4C is a schematic example of communication between the molding device and vehicle using the sleeve.

FIGS. 4A-4C illustrate several methods for authorizing, pairing and securing the sleeve 16 and corresponding fob circuitry 20 of the phone 14. FIG. 4A schematically illustrates downloading fob software to the phone 14 using either Wi-Fi® or cell carrier data service from one or more sources; for example, Ford.com, Apple iTunes®, Google® store, Android Store®, Amazon® store or other source. Specifically, using a web based service, a user logs into a particular source and downloads an application or software specific to a particular phone and vehicle. FIG. 4B schematically illustrates the user downloading an OEM specific transmission protocol and security key to the phone 14 from an OEM or OEM service delivery network 86 in order to customize the fob 20 to a predetermined vehicle 12. This encryption key may be pre-shared with the vehicle and the downloaded protocol packet and compared against each other upon receipt by the vehicle. After downloading the specific protocol and key from the OEM 86, the phone, over Bluetooth® 38, 40 or NFC 42 sends the protocol and key to the sleeve 16 and corresponding fob circuitry 20 to program the sleeve 16 and corresponding fob circuitry 20. The sleeve 16 is also programmed to a particular vehicle using many available methods, an example of such methods is LF to LF programming or pre-production pairing of the sleeve 16 and the receiver module on the vehicle. One example embodiment includes a dongle attached to the sleeve 16 having an LF receiver fitting into the backup pocket of a vehicle for programming. FIG. 4C illustrates that the sleeve 16 and corresponding fob circuitry 20 communicates with the vehicle 12 in the same manner as a traditional fob using UHF or a PEPS LF challenge thus retaining the same security as a conventional RKE/PEPS fob. The communications/instructions from the phone 14 to the sleeve 16 are through Bluetooth® 38, 40 or NFC 42. While Bluetooth® communication requires encrypting data to provide similar levels of security between the phone and fob sleeve as that between the fob sleeve and the vehicle, using phone-to-sleeve communications via NFC provides the highest security by nature of its short communication range. For example, communication from the phone to the sleeve is NFC and then from the sleeve to the vehicle using normal PEPS/RKE protocol communication. This method of communication maintains high levels of security relative to an NFC access/start solution and/or today's PEPS access/start devices.

In an additional example, the RKE/PEPS transmitter functions in the sleeve 16 are generic so that a given OEM's protocol or enabling key can be downloaded to the fob circuitry 20 in the sleeve 16 via the phone's Bluetooth® 38, 40 or NFC 42 transceiver. Further, charging the fob circuitry 20, which includes the RKE/PEPS transmitter in the sleeve 16, would not require any special action from a user/vehicle operator. As set forth above, the fob circuitry 20 can be charged in the following manner: tapping off the wireless charging circuitry 18 in the sleeve 16 to store energy for the fob function, harvesting energy from the phone's Bluetooth or harvesting energy from the phone's NFC if available. The GUI 28 for fob would use the phone display or touchscreen 26 with downloadable apps and communication between the phone and RKE/PEPS transmitter accomplished via the phone's Bluetooth or NFC transceiver functionality. Requiring mating of the sleeve to the vehicle, as is done with current RKE/PEPS fobs today, maintains security. As such, the security of the system is the same as a fob and lies with the secure mating of the sleeve to the vehicle.

In operation, the customer or vehicle owner downloads specific fob software from an application source. The specific fob software includes a GUI 28 for the selected fob or vehicle. The GUI 20 may include a representation of the physical fob or multiple buttons representing fob functions. Since the fob software is a downloadable application, multiple applications, each application representing a separate and distinct fob, can be downloaded to a single phone. As such, one phone could provide different fob images and fob functions for different cars or even different OEM nameplates. The user would have the ability to select different GUI displays for or relating to different vehicles or even personal preferences in color or arrangement or icon/font size and the like.

In the present example, the fob circuitry 20 of the sleeve 16 would behave like an existing PEPS fob when near the vehicle to which it is paired. There would be no need to use the phone 14 GUI 28 to unlock or start the vehicle 12. For example, the user need only bring the sleeve 16 and corresponding fob circuitry 20 within range of or into the vehicle 12, after which they can open the door or start the vehicle 12. In addition, the fob circuitry 20 and sleeve 16, unlike an existing PEPS fob, avoids the risk of inadvertent activation since there are no exposed "buttons" that may be pressed since the phone 12 GUI 28 is not open.

In a further example of the present invention, the phone 14 and sleeve 16 combination enables offering additional fob based features and commands. The following fob commands may be incorporated on the phone 14: Unlock, Lock, Open Lift Gate, Close Lift Gate, Pop Decklid, Windows Down, Windows Up, Remote Start, Start Preconditioning, Stop Preconditioning, Set Cabin Temp, Check Cabin Temp, Time Remaining, Activate Heated Wheel, Activate Heated Seat, and Activate Heated Window. In addition to the vehicle commands the phone 14 and sleeve 16 combination may also include personal security features or functions such as: Panic Button, Car Locator, Rapid Tire Pressure Loss, Activate Perimeter Lights, Alarm Triggered, Door Opened, Trunk/Gate Opened, Vehicle Inclined and Intrusion Sense. Further, the phone 14 and sleeve 16 combination may receive and display vehicle information such as: Door Left Ajar, Fuel Level, Washer Level, Oil Level, Miles, Vehicle VIN, Vehicle Model and Wheel Size. Further, for phones that do not have NFC capability, a custom application along with the subject sleeve could allow the phone-sleeve combination to mimic NFC features so that the phone could be used for NFC tag based features or NFC transfer of information, images or video to another device. The foregoing are examples of various commands and information that may be exchanged between a phone 14 and the vehicle 12 through the sleeve 16 and corresponding fob circuitry 20. It should be understood that the exchange of additional commands and information between the phone 14 and the vehicle 12 is only limited by a design or scope of the application or software performing the specific task, wherein each software application may include multiple GUIs.

As set forth above, the fob circuitry 20 located in the sleeve 16 may be used to activate other vehicle systems. For example, the fob circuitry 20 may activate Ford's Sync® system to open a Bluetooth® or WiFi® connection to enable higher bandwidth communication for various tasks such as: over the air vehicle programming, MP3 downloading to a vehicle, home link transmitter control, vehicle health status, remote access of camera images, vehicle personalization settings, media mode control, media volume control, radio station selection, listening via Sync® microphone and enabling various application link features.

In one embodiment of the present invention, the sleeve 16 may be a wireless sleeve having wireless charging circuitry 18. Wireless charging sleeves for use with phones are known. Placement of coils and wireless charging circuitry 18 in a wireless charging sleeve is unique. Accordingly, the layout for the fob circuitry 20 is customized for each model or type of phone 14. For example, different phones 14 have different antenna configurations. Typically, placing the wireless charging receiving coil of the wireless charging circuitry 18 over the phone's 14 battery sleeve avoids these antennas. The location of the fob circuitry 20, including the Bluetooth® and/or NFC transceivers in the sleeve 16, should be placed to avoid blocking the phone antennas while allowing optimized harvesting of energy. Additionally, the location of fob circuitry 20, including the Bluetooth® and/or NFC transceivers in the sleeve 16, should be placed to reduce influence from the wireless charging coil fields.

One example of the sleeve 16 and fob circuitry 20 includes a battery 19 recharged by tapping off the charging circuitry 18. However, the sleeve 16 need not include wireless charging circuitry 18; instead, it receives and stores power from the 5V USB input 106. In addition, the fob circuitry 20 battery 19 or reserve energy supply may be charged by harvesting Bluetooth® and/or NFC energy from the phone. This approach approach may be best for charge maintenance rather than to charge a fully depleted reserve supply.

Figure 5:
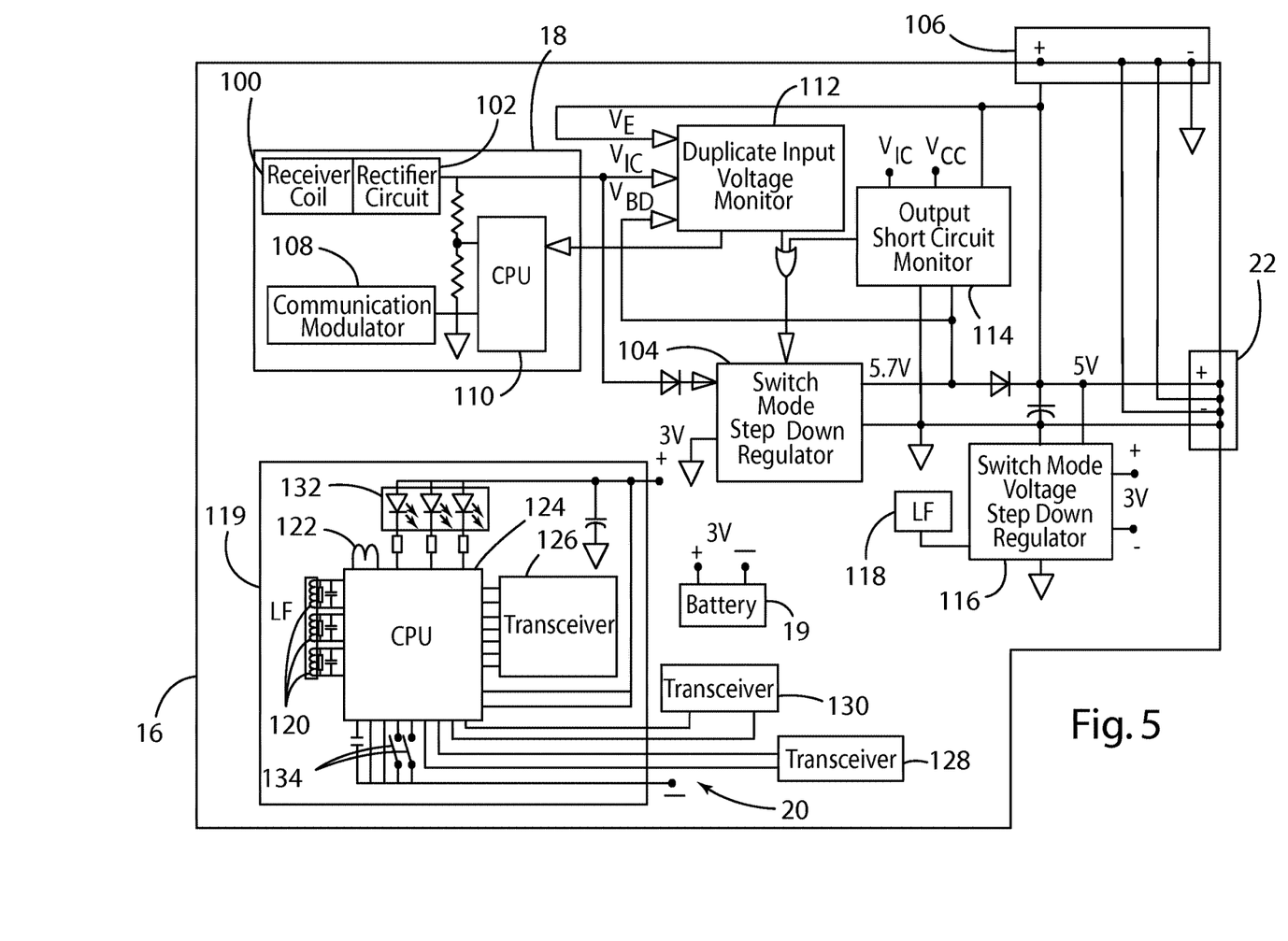
FIG. 5 is a schematic example of one embodiment of the circuitry for use with the sleeve of the present invention.

FIG. 5 schematically illustrates one example of a sleeve 16 of the present invention. The sleeve 16 includes the wireless charging circuit 18 having a receiver coil 100 and rectifier circuit 102. As known, the receiver coil 100 cooperates with a corresponding transmitting coil (not shown) typically located on a charging pad and receives energy from the transmitting coil through inductive or magnetic coupling. A magnetic coupling is established between the sleeve 16 and wireless charging system such that energy received from a transmitter coil system by the sleeve 16 may then be rectified and regulated to a suitable DC voltage (e.g., 5 volts). The rectifier circuit 102 converts energy received through the receiver coil 100 into direct-current used to charge the phone 14 through a 5 volt (5V) switch mode/step down regulator 104. In the disclosed example, the switch mode/step down regulator 104 provides a 5V output to the connector 22 and ultimately to the phone 14. In addition, the sleeve 16 may include a 5V USB pass through connector 106. The pass through 106 provides a 5V output to the phone 14 through connector 22.

In addition, the wireless charging circuit 18 may include a communication modulator 108 and CPU 110 interfacing with both the off-board wireless power transmitter system and a rectifier circuit 102 to deliver only the power reported by the receiver device as that required to fully charge the device. This communication dialog is used by some wireless charging solutions to ensure that energy is delivered only to the battery and not both the battery and foreign metal objects that may be between the sleeve and the transmitter or in close proximity to the transmitter and receiver coils. Further, the sleeve 16 may include a duplicate input voltage monitor 112 and output short circuit monitor 114 operating in connection with the wireless charging circuit 18. The input voltage monitor 112 and output short-circuit monitor 114 in the sleeve 16 prevent an external 5 V DC plug-in from conflicting with the output of the wireless charging circuit 18 and will disable the rectifier output 102 if the 5V voltage to the phone is shorted.

The foregoing description of a wireless charging circuit 18 and associated components is for exemplary purposes only, other systems or components capable of providing power to the phone 14 through a sleeve 16 are also contemplated and should not be limited to the disclosed assembly.

The sleeve 16 further includes a 3 volt (3V) switch mode/step down regulator 116 receiving a 5V input from either the 5V switch mode/step down regulator 104 or the phone 14. The 3V switch mode/step down regulator 116 provides a 3V output to the fob circuitry 20. In an embodiment where the fob circuitry 20 operates off a 5V output, the 3V switch mode/step down regulator 116 is not needed. In addition, block 118 illustrates that the 3V switch mode/step down regulator 116 may harvest energy from Bluetooth activity—either from the phone 22 or other local Bluetooth activity, Wi-Fi—either from the phone 22 or other local Wi-Fi activity, or the vehicle's low frequency antenna transmitters used with the PEPS system. For example, power needed to operate the fob circuitry 20 could be obtained by holding the sleeve 16 adjacent to the vehicle 12 and allowing the vehicle's low frequency PEPS antenna transmitters to power or charge the fob circuitry 20.

In addition, the battery 19 located in the sleeve 16 is connected to and charged by the 3V switch mode/step down regulator 116.

As set forth previously, the fob circuitry 20 typically includes a controller 119 having inherent capability to operate a low-frequency component or LF Receiver, illustrated herein as a plurality of coils 120 for 3-axis signal detection, a near field communication component or NFC transceiver, illustrated herein as a high frequency coil 122; a CPU 124 and a UHF transceiver 126. The controller 119 of the fob circuitry 20 further controls a Bluetooth® transceiver 128 and a Wi-Fi® transceiver 130 all of which, as set forth above, may communicate with the vehicle 12. The Bluetooth transceiver 128 may be Bluetooth classic and Bluetooth Low Energy as required by the target applications.

In addition, the fob circuitry 20 may include a three-color LED 132 used for communicating diagnostic information and for pairing the sleeve to the vehicle and the sleeve to the phone. The fob circuitry 20 may also include buttons 134 used for programming the fob circuitry 20 in the sleeve 16.

The buttons 134 would be point buttons of the type requiring a small pin or other tool to actuate. The buttons may be on the outer surface or the inner surface of the sleeve as logical for the application.

The sleeve 16 may also include a plurality of shielded areas designed to prevent magnetic flux of the receiver coil 100 from leaking into other areas of the sleeve 16 or phone 14 which may substantially alter the operation of the other components of the sleeve 16 and/or phone 14. The shielding may be applied to the inside surface of the sleeve 16 and/or molded into the sleeve 16 so that the shield is substantially between any printed circuit board (PCB) circuitry embedded in the sleeve 16 and transmitter coils of an inductive charging system.

The sleeve 16 may also include a clear or cut out area providing an aperture and non-obstruction for a phone 14 or device camera lens and/or allow optimum performance of the phone 14 or device antennas that may exist in such areas on certain devices and/or to allow access to the phone 14 or device control buttons. It should be noted that the location of the phone 14 or device antennas might vary depending on the device being charged and/or manufacturer of the phone 14 or device. The location and size of a clear or cut out area of sleeve 16 may be customized for a specific phone 14, device and/or manufacturer. Further, the disclosed example contemplates positioning the fob circuitry 20 in the sleeve 16 in an area out of the phone antenna region and away from the wireless charging receiver coil.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for remotely communicating with a vehicle comprising:
    a mobile communication device;
    a sleeve in communication with said mobile communication device, said sleeve including a transceiver, said transceiver in communication with the vehicle;
    said mobile communication device operative to provide commands to the vehicle through said sleeve; and
    said sleeve includes a remote keyless entry or passive entry passive start transmitter.

2. The system as set forth in claim 1 wherein said mobile communication device communicates with said sleeve through transceiver, said transceiver receiving operation programming from said mobile communication device.

3. The system as set forth in claim 1 wherein said mobile communication device includes transceiver protocol wherein said mobile communication device controls said transceiver.

4. The system as set forth in claim 1 wherein said sleeve includes a low power consumption communications protocol using a transceiver allowing two-way communication between endpoints.

5. The system as set forth in claim 1 wherein said mobile communication device includes multi-vehicle programming whereby said communication device cooperates with said sleeve to control multiple vehicles.

6. The system as set forth in claim 1 wherein said mobile communication device includes a graphical user interface.

7. The system as set forth in claim 6 wherein said vehicle is controlled through said graphical user interface.

8. The system as set forth in claim 1 wherein said sleeve includes a wireless charging circuit.

9. The system as set forth in claim 1 wherein said sleeve is a passive key, said sleeve including a passive controller operative to generate a low-frequency challenge to said vehicle to authenticate said sleeve.

10. The system set forth in claim 1 including said sleeve receiving information from said vehicle and said mobile communication device having a screen operative to display information received from said vehicle.

11. The system as set forth in claim 1 wherein said communication device is paired to said sleeve and said sleeve is paired to said vehicle.

12. A communication device comprising:
a body including a touch screen display, said touchscreen display including a graphical user interface;
a processor;
memory;
a program, said program stored in said memory and executed by said processor, said program including instructions for operating various vehicle functions;
a sleeve, said sleeve removably attached to said body, said sleeve including a transmitter and a receiver, said receiver in communication with said body; and said graphical user interface displays a vehicle key fob.

13. A communication device comprising:
a body including a touch screen display, said touchscreen display including a graphical user interface;
a processor;
memory;
a program, said program stored in said memory and executed by said processor, said program including instructions for operating various vehicle functions;
a sleeve, said sleeve removably attached to said body, said sleeve including a transmitter and a receiver, said receiver in communication with said body; and said transmitter is a remote keyless entry or passive entry passive start transmitter.

14. A method for remotely communicating with a vehicle comprising the steps of:
providing a device including a graphic user interface;
providing a sleeve, said sleeve having a transmitter, said sleeve located adjacent said device;
using said device to generate a control signal;
using the transmitter in said sleeve to transmit the control signal to the vehicle to activate inactive vehicle systems allowing direct communication between the activated vehicle systems and the device.

15. The method as set forth in claim 14 including the step of providing said device with multiple control protocols, each of said control protocols associated with a particular vehicle.

16. The method as set forth in claim 14 wherein the device is a phone.

17. A method for remotely communicating with a vehicle comprising the steps of:
providing a device including a graphic user interface;
providing a sleeve, said sleeve having a transmitter, said sleeve located adjacent said device;
using said device to generate a control signal;
using the transmitter in said sleeve to transmit the control signal to the vehicle wherein the device is a phone; and
said phone includes a plurality of applications, each application defining a predetermined graphical user interface associated with a particular vehicle.

18. A method for remotely communicating with a vehicle comprising the steps of:
providing a device including a graphic user interface;
providing a sleeve, said sleeve having a transmitter, said sleeve located adjacent said device;
using said device to generate a control signal;
using the transmitter in said sleeve to transmit the control signal to the vehicle; and
providing the device with a plurality of selectable graphical user interfaces, each of said graphical user interfaces customizable.

* * * * *